(12) United States Patent
Kawashima

(10) Patent No.: US 9,835,364 B2
(45) Date of Patent: Dec. 5, 2017

(54) ACTIVE FILTER CONTROL DEVICE

(71) Applicant: DAIKIN INDUSTRIES, LTD., Osaka-shi, Osaka (JP)

(72) Inventor: Reiji Kawashima, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 156 days.

(21) Appl. No.: 14/651,718

(22) PCT Filed: Nov. 25, 2013

(86) PCT No.: PCT/JP2013/081662
§ 371 (c)(1),
(2) Date: Jun. 12, 2015

(87) PCT Pub. No.: WO2014/091915
PCT Pub. Date: Jun. 19, 2014

(65) Prior Publication Data
US 2015/0323232 A1 Nov. 12, 2015

(30) Foreign Application Priority Data

Dec. 14, 2012 (JP) .................................. 2012-273744

(51) Int. Cl.
*F25B 43/00* (2006.01)
*H02M 1/12* (2006.01)
(Continued)

(52) U.S. Cl.
CPC .............. *F25B 43/003* (2013.01); *H02J 3/01* (2013.01); *H02M 1/14* (2013.01); *H02M 1/12* (2013.01); *Y02E 40/40* (2013.01)

(58) Field of Classification Search
CPC ......... F25B 43/003; H02J 3/01; H02J 3/1842; H02M 1/12; H02M 1/14; Y02E 40/40;
(Continued)

(56) References Cited

U.S. PATENT DOCUMENTS 4,812,669 A * 3/1989 Takeda ..................... H02J 3/01
307/105
4,823,251 A * 4/1989 Kawabata ............ H02H 7/1227
363/95
(Continued)

FOREIGN PATENT DOCUMENTS

JP 5-252751 A 9/1993
JP 9-233701 A 9/1997
(Continued)

OTHER PUBLICATIONS

Izumi et al., "Influence of the Compensation Current Detection Characteristic on the Active Filter Performance," Reports of the Faculty of Engineering, Nagasaki University, Jul. 2000, vol. 30, No. 55, pp. 165-170.

*Primary Examiner* — Dominick L Plakkoottam
*Assistant Examiner* — Melodee Jefferson
(74) *Attorney, Agent, or Firm* — Birch, Stewart, Kolasch & Birch, LLP

(57) ABSTRACT

A harmonic component extraction unit obtains a command value of compensating current from a harmonic component of the load current. A difference current generation unit obtains a deviation between the compensating current and a value obtained by leading a phase of the command value by a predetermined phase difference. A current controller generates a control signal based on output of the difference current generation unit. A driving signal generation circuit generates, based on the control signal, a driving signal driving a parallel active filter.

7 Claims, 8 Drawing Sheets

(51) Int. Cl.
*H02M 1/14* (2006.01)
*H02J 3/01* (2006.01)

(58) Field of Classification Search
CPC .. H02P 21/06; H02P 21/22; H02P 6/10; H02P 2207/05
See application file for complete search history.

(56) References Cited

U.S. PATENT DOCUMENTS

| | | | | |
|---|---|---|---|---|
| 4,989,414 A * | 2/1991 | Murayama | ............ | F04C 28/08 62/196.3 |
| 5,321,598 A * | 6/1994 | Moran | ............ | H02J 3/01 323/207 |
| 5,355,295 A * | 10/1994 | Brennen | ............ | H02J 3/1814 323/207 |
| 5,498,994 A | 3/1996 | Furuta | | |
| 5,548,165 A * | 8/1996 | Mohan | ............ | G05F 1/12 307/36 |
| 6,882,549 B2 * | 4/2005 | Huggett | ............ | H02J 3/01 363/40 |
| 8,971,066 B2 * | 3/2015 | Oi | ............ | H02J 3/01 323/207 |
| 2003/0062776 A1 * | 4/2003 | Skibinski | ............ | H02J 3/1842 307/105 |
| 2003/0090231 A1 * | 5/2003 | Yoshimoto | ............ | H02P 21/22 318/635 |
| 2004/0183496 A1 * | 9/2004 | Yoshimoto | ............ | H02P 25/024 318/715 |
| 2004/0195993 A1 * | 10/2004 | Yoshimoto | ............ | H02P 21/06 318/802 |
| 2006/0049796 A1 * | 3/2006 | Nakai | ............ | H02P 21/06 318/807 |
| 2009/0102285 A1 * | 4/2009 | Haga | ............ | H02M 1/12 307/31 |
| 2011/0057517 A1 * | 3/2011 | Zhang | ............ | H02J 3/01 307/105 |
| 2011/0074365 A1 * | 3/2011 | Nakayama | ............ | H02P 9/007 322/27 |
| 2011/0211374 A1 * | 9/2011 | Yoshida | ............ | H02M 1/4225 363/37 |
| 2011/0228573 A1 * | 9/2011 | Yoshida | ............ | H02M 1/4225 363/37 |
| 2011/0241586 A1 * | 10/2011 | Tobari | ............ | H02P 21/22 318/400.23 |

FOREIGN PATENT DOCUMENTS

| | | |
|---|---|---|
| JP | 11-103527 A | 4/1999 |
| JP | 11-318029 A | 11/1999 |
| JP | 2003-169481 A | 6/2003 |
| JP | 3755220 B2 | 3/2006 |
| JP | 2008-234298 A | 10/2008 |

* cited by examiner

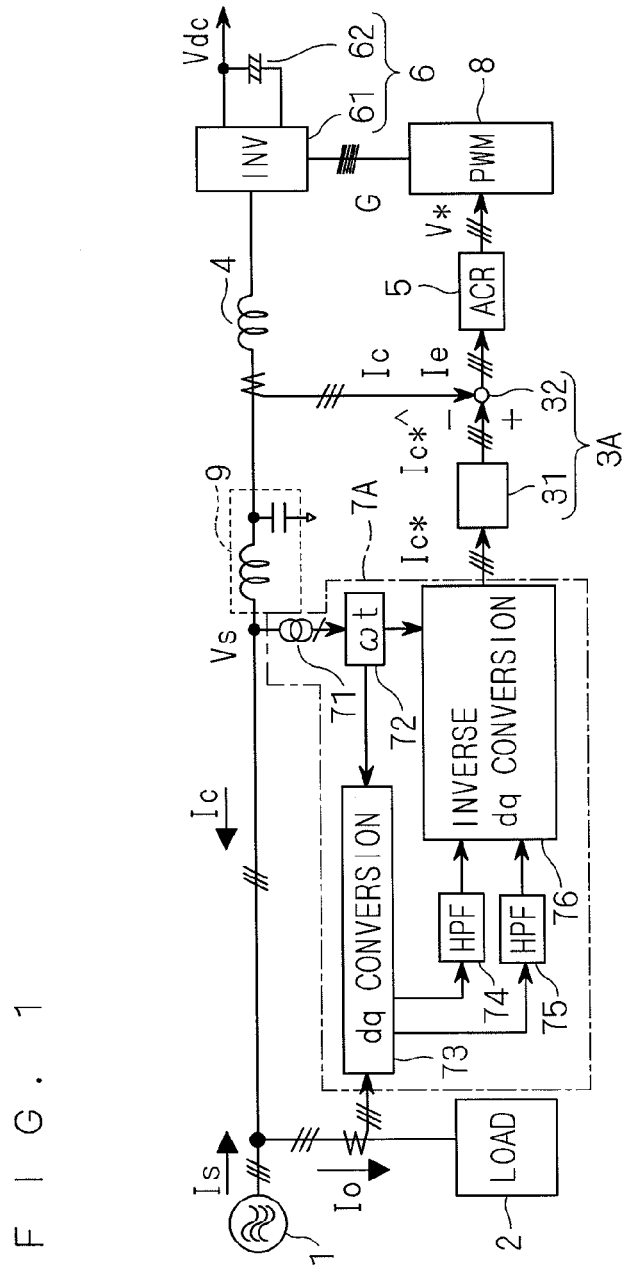
F I G. 1

F I G. 2
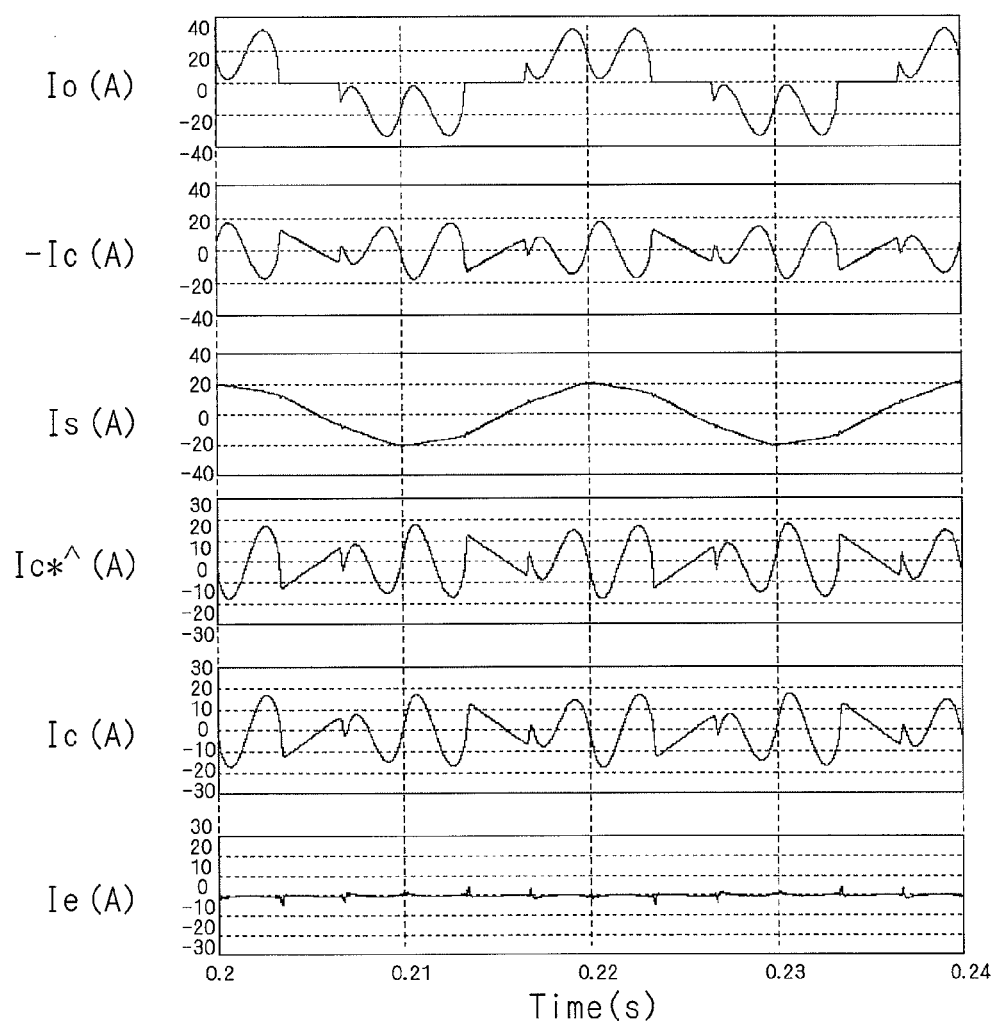

F I G. 3
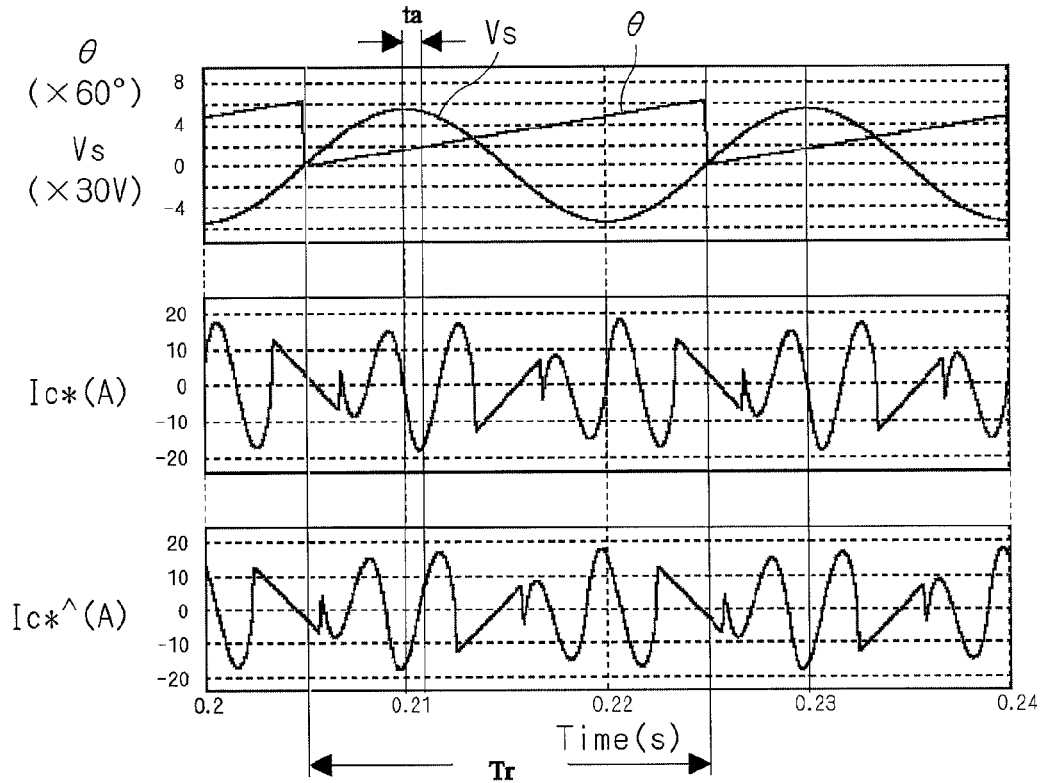
F I G. 4
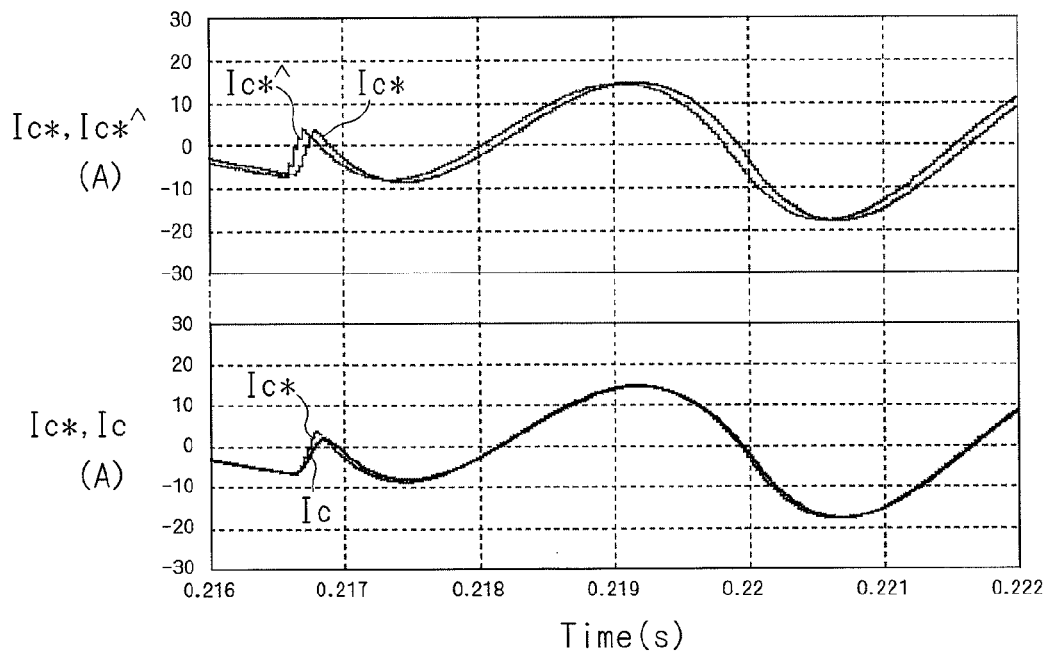

F I G. 5
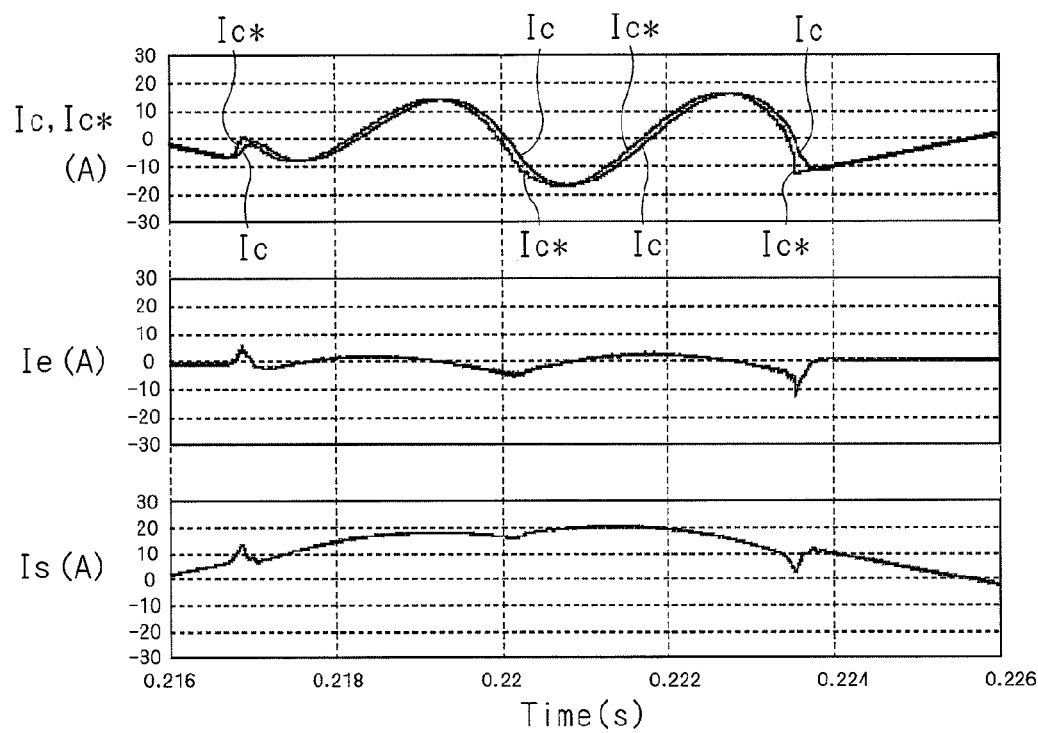
F I G. 6
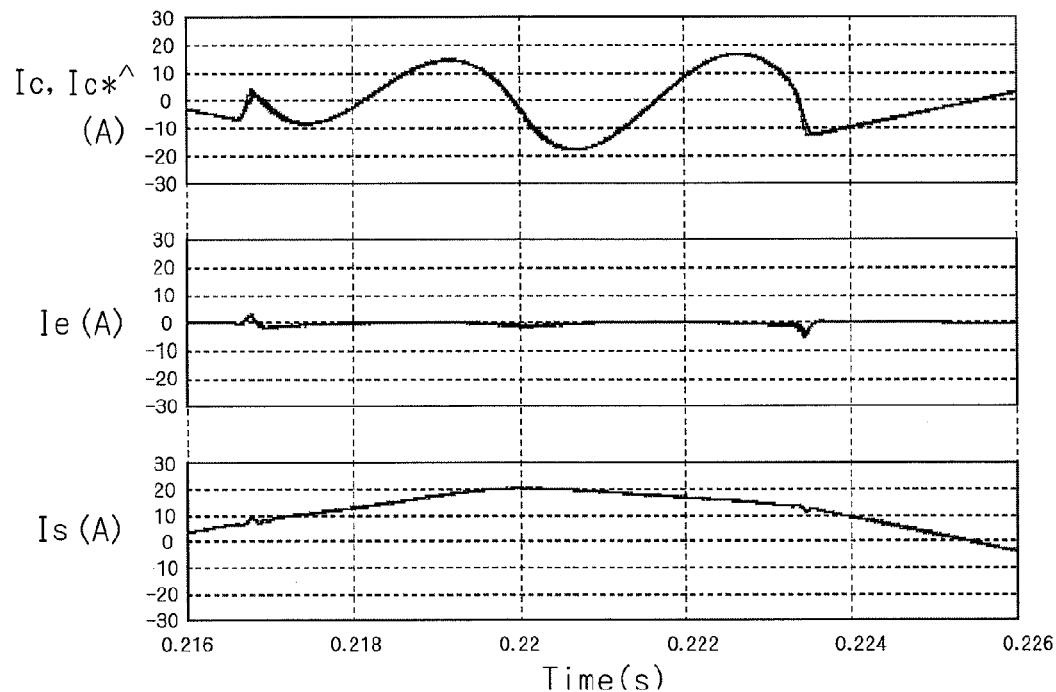

F I G. 7
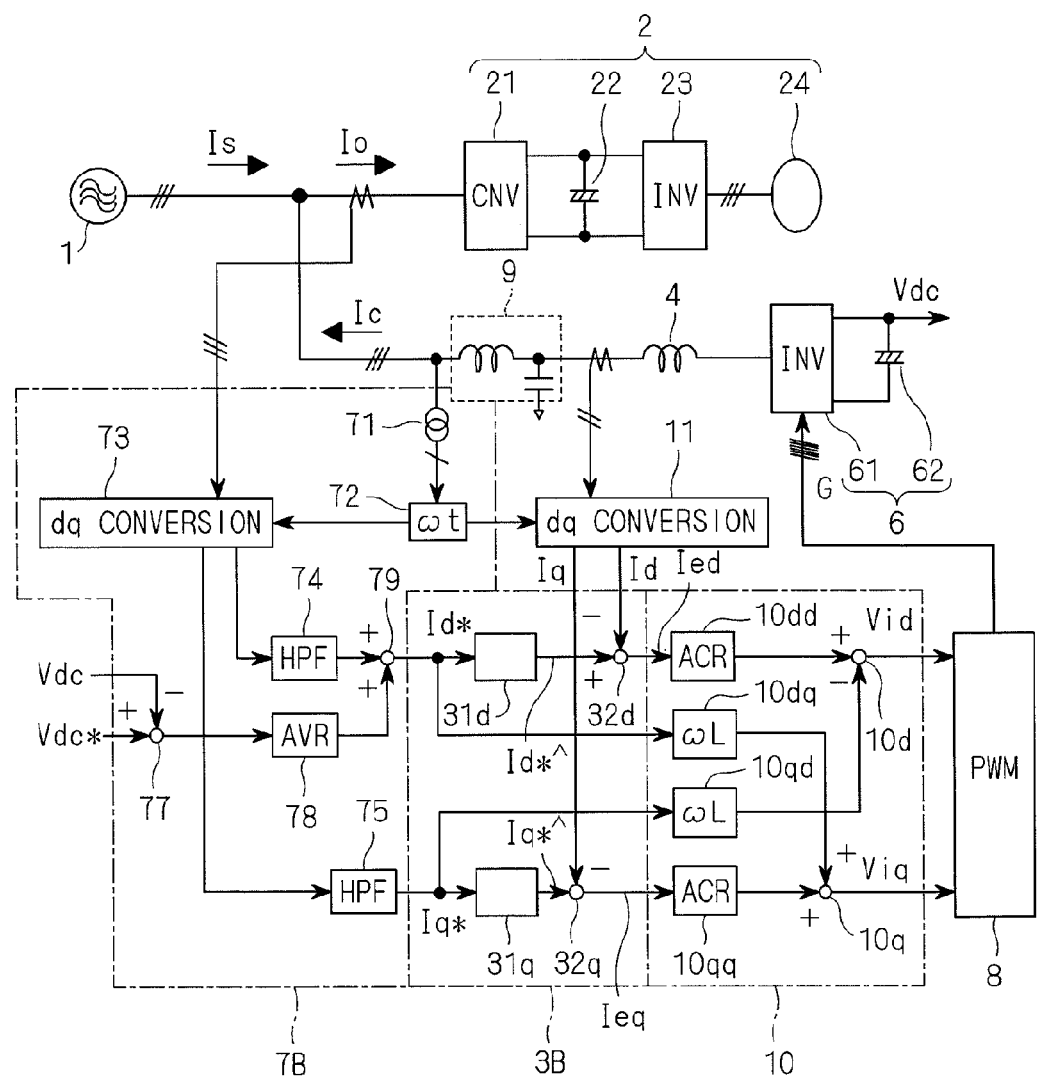

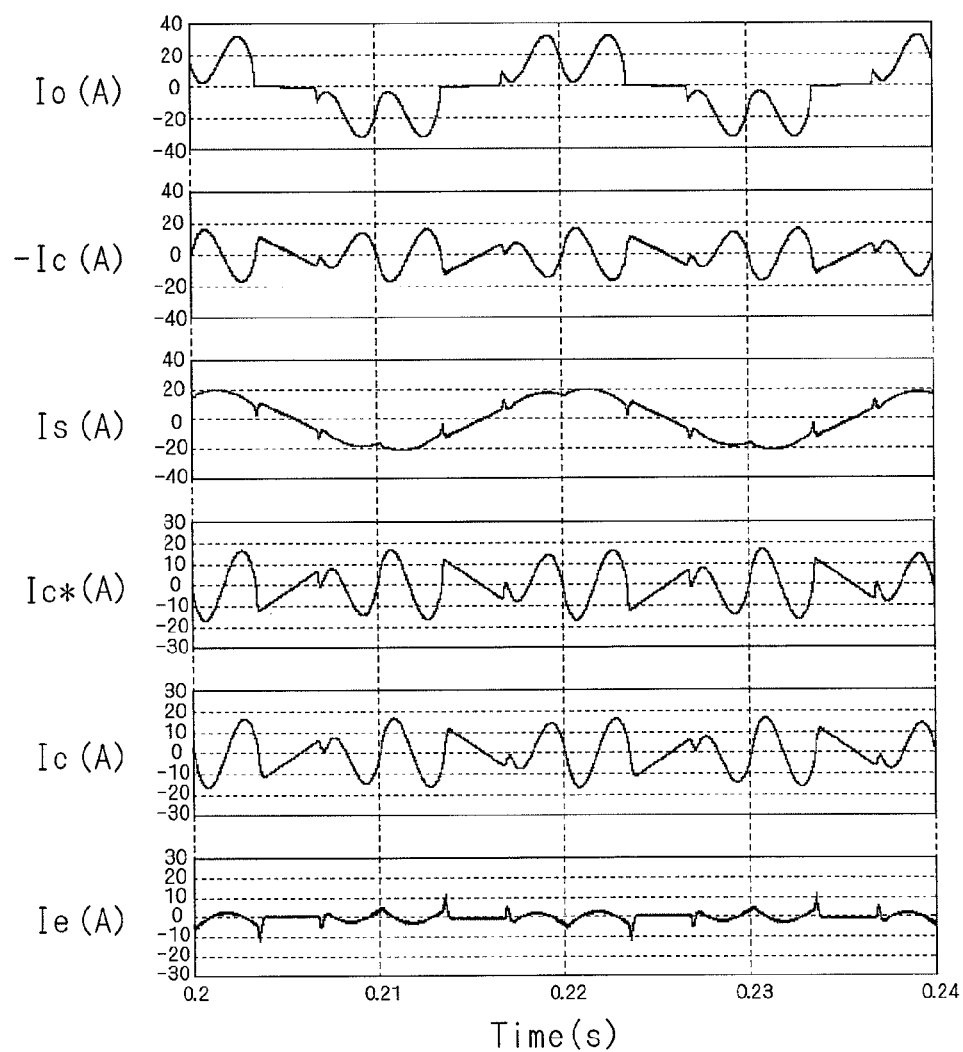
F I G . 1 0

ACTIVE FILTER CONTROL DEVICE

This is the National Stage filing under 35 U.S.C. 371 of the International Application PCT/JP2013/081662, filed Nov. 25, 2013, which claims priority under U.S.C. 119 (a-d) to JP2012-273744, filed Dec. 14, 2012.

TECHNICAL FIELD

The present disclosure relates to technology for controlling an active filter and, in particular, to technology for controlling a parallel active filter.

BACKGROUND ART

When load current flows from an AC power supply to a load, a so-called harmonic component is typically generated in the load current. The harmonic component is a well-known problem as it causes so-called harmonic interference, and is thus to be reduced.

An active filter is proposed as one approach to solving the problem. Particularly a parallel active filter is connected to the AC power supply through an interconnection reactor and passing compensating current to reduce a harmonic component of power current flowing through the AC power supply.

Specifically, in order to reduce the harmonic component of the power current, processing of passing compensating current of an opposite phase to this through the parallel active filter (or supplying compensating current of the same phase as this from the parallel active filter) is performed.

The harmonic component of the load current is adopted as a command value of the compensating current, and, based on a deviation of the compensating current from the command value, a current controller operates to control operation of the parallel active filter.

The parallel active filter is introduced, for example, in Katsuhiro Izumi and four others, "Influence of the Compensation Current Detection Characteristic on the Active Filter Performance", Reports of the Faculty of Engineering, Nagasaki University, Vol. 30, No. 55, pp. 165-170, July 2000 and FIG. 10 of Japanese Patent No. 3755220.

Further, Japanese Patent Application Laid-open No. 5-252751 and Japanese Patent Application Laid-open No. 2008-234298 are listed as prior art documents disclosing technology related to the present application. Japanese Patent Application Laid-open No. 5-252751 discloses technology for suppressing overcurrent in the event of accidents, and Japanese Patent Application Laid-open No. 2008-234298 discloses technology for suppressing a time delay of operation of performing rotating coordinate conversion and a delay occurring when current is detected.

SUMMARY OF INVENTION

Problems to be Solved by the Invention

The parallel active filter is controlled by the operation of the current controller based on the deviation of current as described above. The current controller, however, is typically configured as a proportional integral controller, and, due to arithmetic processing performed by the current controller, the compensating current tends to be delayed from the command value thereof. The divergence between the command value and the compensating current is likely to be more noticeable especially when the command value varies more significantly.

Such a delay caused by the arithmetic processing becomes an impediment to suppression of the harmonic component of the power current. However, Japanese Patent No. 3755220 and Japanese Patent Application Laid-open No. 5-252751 as well as Katsuhiro Izumi and four others, "Influence of the Compensation Current Detection Characteristic on the Active Filter Performance", Reports of the Faculty of Engineering, Nagasaki University, Vol. 30, No. 55, pp. 165-170, July 2000 are silent about such an impediment.

The present disclosure has been conceived in view of the above-mentioned standpoint, and aims to provide technology for improving, in the active filter, the impediment to suppression of the harmonic component of the power current caused by the arithmetic processing performed by the current controller.

Means for Solving the Problems

An active filter control device according to the present disclosure is a device that controls a parallel active filter (6) connected, through an interconnection reactor (4), to an AC power supply (1) that supplies load current (Io) to a load (2), and outputting compensating current (Ic; Id, Iq).

The first aspect thereof includes a harmonic component extraction unit (7A; 7B) obtaining a command value (Ic*; Id*, Iq*) of the compensating current from a harmonic component of the load current; a difference current generation unit (3A; 3B) obtaining a deviation (Ie) between the compensating current and a value (Ic*^; Id*^, Iq*^) obtained by leading a phase of the command value by a predetermined phase difference (360°×ta/Tr); a current controller (5; $10dd$, $10qq$) generating a control signal (V*; Vid, Viq) based on output of the difference current generation unit; and a driving signal generation circuit (8) generating, based on the control signal, a driving signal (G) driving the parallel active filter.

The second aspect of the active filter control device according to the present disclosure is the first aspect, wherein the difference current generation unit (3A; 3B) includes: a delay unit (31) performing processing of delaying the command value (Ic*; Id*, Iq*) by a phase obtained by subtracting the predetermined phase difference (360°×ta/Tr) from a phase for one cycle of the AC power supply (1); and a subtracter (32) obtaining a difference between output (Ic*^; Id*^, Iq*^) of the delay unit and the compensating current (Ic; Id, Iq).

The third aspect of the active filter control device according to the present disclosure is any one of the first aspect to the second aspect, wherein the command value (Ic*) is obtained by removing a DC component from the load current (Io) grasped in a rotating coordinate system synchronizing with a phase of the AC power supply (1), and further performing coordinate conversion so as to be grasped in a fixed coordinate system, the compensating current (Ic) is grasped in the fixed coordinate system, and the deviation (Ie) is obtained in the fixed coordinate system.

The fourth aspect of the active filter control device according to the present disclosure is any one of the first aspect to the second aspect, wherein the command value (Id*, Iq*) is obtained by removing a DC component from the load current (Io) grasped in a rotating coordinate system synchronizing with a phase of the AC power supply (1), the compensating current (Id, Iq) is grasped in the rotating coordinate system, and the deviation (Ied, Ieq) is obtained in the rotating coordinate system.

The fifth aspect of the active filter control device according to the present disclosure is the second aspect, wherein the load (2) is an air conditioner including: an inverter (23); and a compressor (24) controlled by the inverter to compress a refrigerant.

Effects of the Invention

According to the first aspect of the active filter control device according to the present disclosure, the phase of the command value of the compensating current is led by the predetermined phase difference to eliminate a delay time in the current controller. The phase difference can be set appropriately in accordance with the delay time.

According to the second aspect of the active filter control device according to the present disclosure, the phase of the command value is substantially led by the delay unit as the command value varies with approximately the same waveform for each cycle of the AC power supply.

According to the third aspect of the active filter control device according to the present disclosure, a component, of the load current grasped in the rotating coordinate system, synchronizing with the phase of the AC power supply appears as a DC component. Therefore, by removing the DC component from the load current grasped in the rotating coordinate system, the harmonic component of the load current is obtained as the command value of the compensating current.

According to the fourth aspect of the active filter control device according to the present disclosure, the rotating coordinate system is grasped as a two-phase coordinate system even when the AC power supply is a multi-phase power supply having three or more phases, and thus the configuration of the delay unit can easily be simplified. The cycles of the command value and the compensating current in the rotating coordinate system are shorter than those in the fixed coordinate system, and thus the configuration of the delay unit can easily be simplified when the delay unit is adopted.

According to the fifth aspect of the active filter control device according to the present disclosure, the variation of the load is small, and thus the delay unit substantially leads the phase of the command value with high accuracy.

Objects, features, aspects and advantages of the present disclosure will become more apparent from the following detailed description and the accompanying drawings.

BRIEF DESCRIPTION OF DRAWINGS

FIG. 1 is a block diagram showing the aspect in which the active filter control device is adopted in a first embodiment;

FIGS. 2 to 4 are graphs showing the effects of the first embodiment;

FIG. 5 is a graph showing technology to be compared with the first embodiment;

FIG. 6 is a graph showing the effects of the first embodiment;

FIG. 7 is a block diagram showing the aspect in which the active filter control device is adopted in a second embodiment;

FIG. 10 is a graph showing the technology to be compared with the first embodiment.

DESCRIPTION OF EMBODIMENTS

First Embodiment

Figure 8:
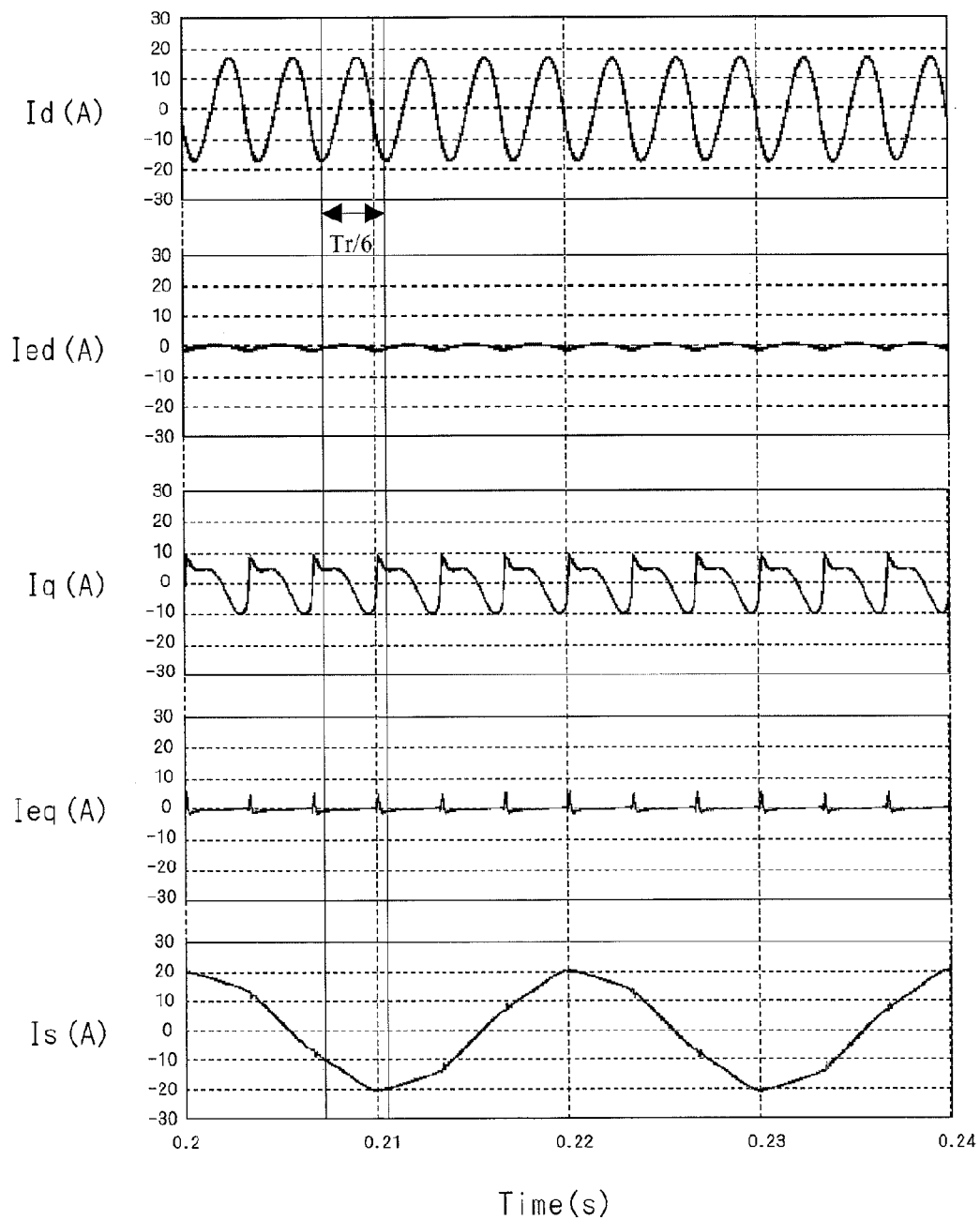
FIG. 8 is a graph showing the effects of the second embodiment.

FIG. 1 is a block diagram showing the aspect in which the active filter control device is adopted in the present embodiment. Description is made below by taking a case of adopting three-phase alternating current as an example. However, this number of phases is an example, and there is no need to limit the number of phases to three.

A three-phase AC power supply 1 supplies three-phase load current Io to a load 2. A parallel active filter 6 is connected to the AC power supply 1 through a three-phase interconnection reactor 4. The parallel active filter 6 outputs three-phase compensating current Ic. Description is made herein on the assumption that a direction in which the compensating current Ic flows from the parallel active filter 6 to the AC power supply 1 is taken as being positive, and the sum of power current Is flowing from the AC power supply 1 and the compensating current Ic is equal to the load current Io.

Of course, if the direction of the compensating current Ic is taken as being opposite to the direction in the description of the present embodiment, only the polarity sign positive/negative) of the compensating current Ic changes.

The parallel active filter 6 includes an inverter 61 and a capacitor 62, for example. The inverter 61 inputs and outputs the compensating current. Ic to charge and discharge the capacitor 62 at a DC voltage Vdc. For example, the inverter 61 is a voltage source inverter, three current paths are connected in parallel to the capacitor 62, and two switching elements are provided for each of the current paths.

The active filter control device includes a harmonic component extraction unit 7A, a difference current generation unit 3A, a current controller 5, and a driving signal generation circuit 8.

The harmonic component extraction unit 7A obtains a command value Ic* of the compensating current Ic from the harmonic component of the load current Io. Specific configuration is known from Japanese Patent Application Laid-open No. 2008-234298 and other(s), so that description thereof is made only briefly. The harmonic component extraction unit 7A includes a transformer 71, a phase detector 72, a dq converter 73, high-pass filters 74 and 75, and an inverse dq converter 76.

The transformer 71 detects one phase of a three-phase voltage Vs of the AC power supply 1, and provides it to the phase detector 72. The phase detector 72 transfers the detected phase to the dq converter 73 and the inverse dq converter 76.

The dq converter 73 performs three-phase/two-phase conversion on the load current Io as detected to obtain d-axis current and q-axis current. The d-axis current and the q-axis current are provided to the inverse dq converter 76, after being removed low-frequency components, particularly DC components, by the high-pass filters 74 and 75. The inverse dq converter 76 performs two-phase/three-phase conversion to generate the command value Ic* of the compensating current Ic. The d axis and the q axis are herein axes in the rotating coordinate system rotating in synchronization with the phase detected by the phase detector 72.

Components, of the load current Io, synchronizing with the phase of the AC power supply 1 appear as DC components in the d-axis current and the q-axis current. That is to say, the d-axis current and the q-axis current include only DC components in the absence of the harmonic component in the load current Io. The above-mentioned high-pass filters 74 and 75 thus output only the harmonic components of the load current Io, which appear as the d-axis current and the q-axis current. As a result, the command value Ic* represents the harmonic component of the load current Io. Therefore, when the compensating current Ic matches the command value Ic* with no phase shift, the compensating current Ic absorbs the harmonic component of the load current Io, and the harmonic component is not generated in the power current Is.

The difference current generation unit 3A obtains a deviation Ie between the compensating current Ic and a value Ic*^ obtained by leading a phase of the command value Ic* by a predetermined phase difference, which is described later. The command value Ic* is obtained by removing the DC component from the load current Io grasped in the rotating coordinate system (dq coordinate system) synchronizing with the phase of the AC power supply 1, and further performing coordinate conversion so as to be grasped in the fixed coordinate system. The compensating current Ic and the deviation Ie are also obtained in the fixed coordinate system.

The current controller 5 performs processing of generating a three-phase voltage command value V* based on the output of the difference current generation unit 3A. The current controller 5 achieves the above-mentioned processing, for example, by performing PI (proportional integral) control.

The driving signal generation circuit 8 generates, based on the voltage command value V*, a driving signal G driving the parallel active filter 6. The driving signal generation circuit 8 generates the driving signal G, for example, by performing logical operation on results of comparison between the voltage command value V* and a carrier. Therefore, it can be said that the voltage command value V* is a control signal indirectly controlling the parallel active filter 6 through the driving signal G.

It is desirable to provide a low-pass filter 9 in terms of removing ripples of the compensating current Ic. Although only the low-pass filter 9 for one phase is shown herein, the low-pass filter 9 is actually provided for each of three phases.

Since the current controller 5 generates the voltage command value V* by performing the PI control as described above, a delay time (hereinafter, this delay time is expressed as a time ta) occurs. If the deviation Ie is obtained from the command value Ic* and the compensating current Ic, the time ta causes a difference between the compensating current Ic and the harmonic component, and becomes an impediment to suppression of the harmonic component of the power current Is.

In the present embodiment, however, the difference current generation unit 3A obtains the deviation Ie from the compensating current Ic and the value Ic*^ obtained by leading the phase of the command value Ic* by a phase corresponding to the time ta to eliminate or reduce the above-mentioned impediment.

The phase amount φ for the phase leading can be expressed as φ=360°×ta/Tr by introducing a cycle Tr of the voltage Vs output from the AC power supply 1. The time ta is considered to take a constant value in a steady state. Therefore, the time ta can be estimated in advance through measurement or presumption, and the phase amount φ can also be set in advance appropriately.

The difference current generation unit 3A includes, for example, a delay unit 31 and a subtracter 32. The delay unit 31 performs processing of providing a delay by a phase obtained by subtracting the phase amount φ from 360 degrees (i.e., a phase for one cycle of the voltage Vs). Since the harmonic component cyclically varies at the same cycle as the voltage Vs in the steady state, the delay becomes substantially equivalent to the phase leading by the phase amount φ. The subtracter 32 obtains the deviation Ie as a difference between the output Ic*^ of the delay unit 31 and the compensating current Ic.

FIGS. 2 to 4 and 6 are graphs showing the effects of the present embodiment. FIG. 5 is a graph showing the technology to be compared with the present embodiment. In FIGS. 2 to 6, various amounts are shown for only one phase. This is because, in a case of adopting a balanced load as the load 2, three phases of the load current Io are balanced, three phases of each of the power current Is and the compensating current Ic are balanced, and three phases of each of these amounts only differ from one another by 120 degrees.

FIG. 2 shows, downwards from an upper row, waveforms of the load current Io, a value (−Ic) obtained by reversing the polarity of the compensating current Ic, the power current Is, the phase-led command value Ic*^, the compensating current Ic, and the deviation Ie, respectively.

FIG. 3 shows waveforms of the voltage Vs and its phase θ in an upper row, a waveform of the command value Ic* in a middle row, and a waveform of the phase-led command value Ic*^ in a lower row, respectively. The time ta and the cycle Tr are also shown. It is visually recognized that the command value Ic*^ is led from the command value Ic* by the time ta.

FIG. 4 shows waveforms of the command value Ic* and the phase-led command value Ic*^ in an upper row and waveforms of the command value Ic* and the compensating current Ic in a lower row. The waveforms are shown in FIG. 4 in an extended time axis, compared to the waveforms shown in FIG. 3. It is visually recognized from the waveforms in the upper row of FIG. 4 that the phase-led command value Ic*^ is led from the command value Ic*, as visually recognized from the middle and lower rows of FIG. 3. It is visually recognized from the waveforms in the lower row of FIG. 4 that the command value Ic* and the compensating current Ic have approximately the same waveform.

FIG. 5 is a graph showing various amounts obtained when the delay amount in the delay unit 31 is set to 0 (i.e., the phase amount φ is also set to 0). Waveforms of the (not phase-led) command value Ic* and the compensating current Ic are shown in an upper row, a waveform of the deviation Ie is shown in a middle row, and a waveform of the power current Is is shown in a lower row.

FIG. 6 is a graph showing various amounts obtained when the delay unit 31 provides a delay substantially corresponding to the phase leading by the phase amount φ. Waveforms of the phase-led command value Ic*^ and the compensating current Ic are shown in an upper row, a waveform of the deviation Ie is shown in a middle row, and a waveform of the power current Is is shown in a lower row.

Figure 9:
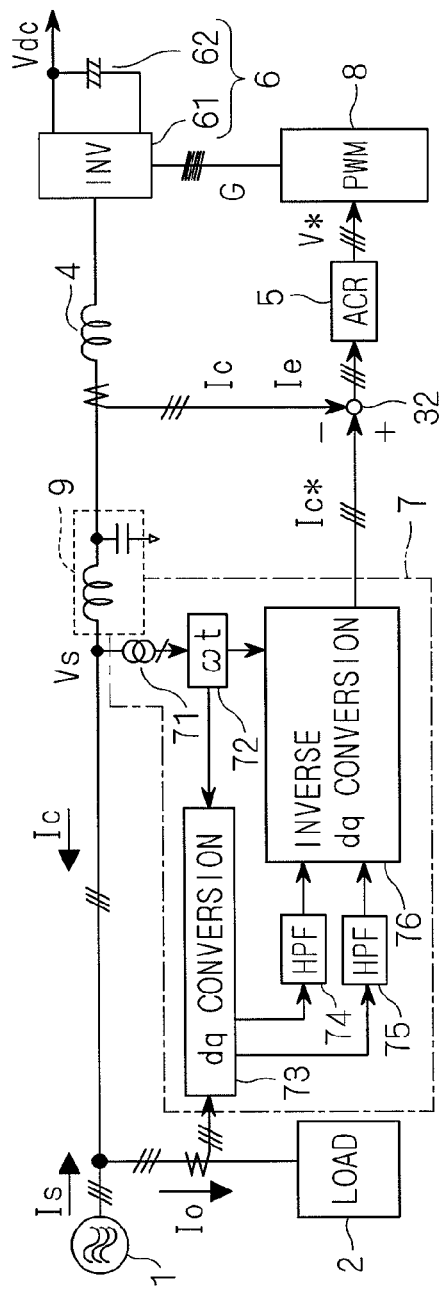
FIG. 9 is a block diagram showing the technology to be compared with the first embodiment.

FIG. 9 shows configuration obtained by omitting the delay unit 31 from FIG. 1 and substantially corresponding to configuration shown in FIG. 1 when the phase amount φ is set to 0. FIG. 10 is a graph showing waveforms of various amounts obtained with the configuration so as to correspond to FIG. 2.

It is visually recognized from comparison between FIGS. 5 and 6 and comparison between FIGS. 2 and 10 that the deviation Ie is reduced, and the harmonic component of the power current Is is thereby significantly reduced by obtaining the compensating current Ic through control using not the command value Ic but the phase-led command value Ic*^.

That is to say, it is known that the impediment to suppression of the harmonic component of the power current Is caused by the arithmetic processing performed by the current controller 5 has been improved in the present embodiment.

Second Embodiment

The impediment to suppression of the harmonic component of the power current Is caused by the arithmetic processing performed by the current controller can also be improved when the command value of the compensating current is grasped in the rotating coordinate system by performing phase leading in a similar manner to the first embodiment.

FIG. 7 is a block diagram showing the aspect in which the active filter control device is adopted in the present embodiment. In contrast to the configuration shown in the block diagram of FIG. 1 in the first embodiment, the harmonic component extraction unit 7A has been replaced by a harmonic component extraction unit 7B, the difference current generation unit 3A has been replaced by a difference current generation unit 3B, and the current controller 5 has been replaced by a phase voltage command generation unit 10, and a dq converter 11 has been added in the configuration in the present embodiment. Furthermore, more detailed configuration of the load 2 is shown.

In the example of the present embodiment, the load 2 is an air conditioner including an inverter 23 and a compressor 24 controlled by the inverter 23 to compress a refrigerant (not shown). The load 2 further includes a converter 21 for supplying DC power to the inverter 23, and a capacitor 22 interposed in parallel between the converter 21 and the inverter 23.

Such a load 2 is desirable as the variation of the load is small, and thus the phase of the command value is substantially led with high accuracy.

The dq converter 11 performs dq conversion on the compensating current Ic, and outputs d-axis current Id and q-axis current Iq.

The harmonic component extraction unit 7B has such configuration that the inverse dq converter 76 has been omitted from the harmonic component extraction unit 7A, and a subtracter 77, a voltage controller 78, and an adder 79 have been added. Functions of and mutual connection relationships among the transformer 71, the phase detector 72, the dq converter 73, and the high-pass filters 74 and 75 of the harmonic component extraction unit 7B are the same as those of the harmonic component extraction unit 7A.

The subtracter 77 obtains a deviation of the DC voltage Vdc supported by the capacitor 62 from the command value Vdc* thereof. The voltage controller 78 performs the PI control on the deviation obtained from the subtracter 77 to obtain a correction value of the d-axis current. The correction value is added to the output of the high-pass filter 74 (for the d-axis current) by the adder 79. As a result, a d-axis current command value Id* is obtained from the adder 79.

A q-axis current command value Iq* is obtained from the high-pass filter 75 for the q-axis current. It can be said that the d-axis current command value Id* and the q-axis current command value Iq* are the harmonic components of the load current Io considering pulsation of the DC voltage Vdc as grasped in the rotating coordinate system. These command values can thus be grasped as command values of the d-axis current Id and the q-axis current Iq that are the compensating current Ic grasped in the rotating coordinate system.

The difference current generation unit 3B includes delay units 31$d$ and 31$q$, and subtracters 32$d$ and 32$q$. Like the delay unit 31 shown in the first embodiment, each of the delay units 31$d$ and 31$q$ performs processing of providing a delay by a phase obtained by subtracting each of the phase amounts $\phi$d and $\phi$q from 360 degrees. These phase amounts $\phi$d and $\phi$q are described later. A phase-led d-axis current command value Id*^ and a phase-led q-axis current command value Iq*^ are respectively obtained from the d-axis current command value Id* and the q-axis current command value Iq* through the delay processing.

Like the subtracter 32 shown in the first embodiment, the subtracters 32$d$ and 32$q$ respectively output deviations Ied and Ieq. That is to say, the deviation Ied between the phase-led d-axis current command value Id*^ and the d-axis current Id as well as the deviation Ieq between the phase-led q-axis current command value Iq*^ and the q-axis current Iq are respectively obtained from the subtracters 32$d$ and 32$q$.

The phase voltage command generation unit 10 includes current controllers 10$dd$ and 10$qq$. The current controllers 10$dd$ and 10$qq$ respectively performs the PI control on the deviations Ied and Ieq to output voltage command values Vid and Viq. Assuming that delay times td and tq respectively occur through the PI control performed by the current controllers 10$dd$ and 10$qq$, effects similar to those obtained in the first embodiment is obtained by setting the above-mentioned phase amounts $\phi$d and $\phi$q as follows:

$$\phi d = 360° \times td/Tr;\ \phi q = 360° \times tq/Tr$$

Further, FIG. 7 shows the aspect in which configuration (hereinafter, referred to as "non-interference configuration") to avoid so-called interference between current control in the d-axis and current control in the q-axis is adopted, and the voltage command values Vid and Viq are corrected. The non-interference configuration is known technology as disclosed, for example, in Japanese Patent Application Laid-open No. 5-252751, so that description thereof is made only briefly.

Specifically, multipliers 10$dq$ and 10$qd$, a subtracter 10$d$, and an adder 10$q$ have been additionally provided. The multiplier 10$dq$ multiplies the product $\omega$L of an angular frequency $\omega(=2\pi/Tr)$ of the AC voltage Vs and inductance L of the interconnection reactor by the d-axis current command value Id*, and provides it to the adder 10$q$. The multiplier 10$qd$ multiplies the product $\omega$L of the angular frequency $\omega$ and the inductance L by the q-axis current command value Iq*, and provides it to the subtracter 10$d$. The subtracter 10$d$ corrects the voltage command value Vid obtained from the current controller 10$dd$ by subtracting the output of the multiplier 10$qd$. The adder 10$q$ corrects the voltage command value Viq obtained from the current controller 10$qq$ by adding the output of the multiplier 10$dq$.

Note that the (not phase-led) d-axis current command value Id* and q-axis current command value Iq* are respectively provided to the multipliers 10$dq$ and 10$qd$. This is based on such a standpoint that a delay as in the processing performed by the current controllers 10$dd$ and 10$qq$ does not occur in the processing performed by the multipliers 10$dq$ and 10$qd$.

However, the influence of the non-interference configuration is small in the steady state, and the delay occurring in the delay units 31$d$ and 31$q$ does not substantially correspond to the phase leading. From this standpoint, the phase-led d-axis current command value Id*^ and the phase-led q-axis current command value Iq*^ may respectively be provided to the multipliers 10$dq$ and 10$qd$.

Note that the multipliers 10*dq* and 10*qd*, the subtracter 10*d*, and the adder 10*q* can naturally be omitted when interference between the d-axis and the q-axis is not considered.

In the present embodiment, the driving signal generation circuit 8 generates, based on the voltage command values Vid and Viq for two phases, the driving signal G driving the parallel active filter 6, in contrast to the first embodiment. Therefore, it can also be said that the voltage command values Vid and Viq are control signals indirectly controlling the parallel active filter 6 through the driving signal G as with the voltage command value V* for three phases. Since the configuration of the driving signal generation circuit 8 having this function is well known, description thereof is omitted herein.

FIG. 8 is a graph showing the effects of the second embodiment, and shows, downwards from an upper row, respective waveforms of the d-axis current Id, the deviation Ied, the q-axis current Iq, the deviation Ieq, and the power current Is in the stated order.

The d-axis current Id cyclically varies at a cycle Tr/6, which is ⅙ of the cycle Tr of the power current Is, reflecting that the power current Is actually has three phases. The d-axis current Id is approximately sinusoidal. Similarly, the q-axis current Iq also cyclically varies at the cycle Tr/6.

It is known that the harmonic component is suppressed as the deviations Ied and Ieq are small, and the power current Is is approximately sinusoidal.

As described so far, it is known that the impediment to suppression of the harmonic component of the power current Is caused by the arithmetic processing performed by the current controllers 10*dd* and 10*qq* has been improved in the present embodiment as in the first embodiment.

As described above, in the present embodiment, the compensating current Ic is grasped as the d-axis current Id and the q-axis current Iq in the rotating coordinate system and the deviations Ied and Ieq are obtained in this rotating coordinate system. Since the rotating coordinate system can be grasped as a two-phase coordinate system even when the AC power supply 1 is a multi-phase power supply having three or more phases, the delay units 31*d* and 31*q* as well as the current controllers 10*dd* and 10*qq* for two phases are sufficient. In the first embodiment, the delay unit 31 and the current controller 5 are actually required for each of three phases.

Further, in the present embodiment, particularly the fact that the d-axis current Id and the q-axis current Iq cyclically vary at a cycle that is ⅙ of the cycle Tr of the AC voltage Vs brings about other effects. That is to say, the cycles of the command values Id* and Iq* as well as the cycles of the d-axis current Id and the q-axis current Iq as the compensating current in the rotating coordinate system are shorter than the cycles Tr of them (the command value Ic* and the compensating current Ic in the first embodiment) in the fixed coordinate system. This easily simplifies the configuration in which the delay units 31*d* and 31*q* are adopted.

Specifically, in a case where FIFO memory is used as the delay unit 31 shown in the first embodiment, for example, parts for the cycle Tr are sequentially stored, and sequentially output with the predetermined delay amount to substantially perform the phase-leading processing. Since the command value Ic* is stored for each of three phases in the example of the first embodiment, memory capacity that is three times larger than the cycle Tr is substantially required.

On the other hand, in a case where the FIFO memory is used as the delay unit 31*d*, it suffices that the d-axis current command values Id* for the cycle Tr/6 are sequentially stored, and sequentially output with the predetermined delay amount. The same applies to the delay unit 31*q*. The required memory capacity is thus ⅓ of the cycle Tr, and is reduced to ⅙ of that in the first embodiment.

Modifications

Assume that the number of storage locations of the command value Ic* for one phase in the memory adopted as the delay unit 31 is N. For example, if a control cycle of the current control is 50 µs when Tr=20 ms (corresponding to a power supply frequency of 50 Hz) is satisfied, it is desirable to satisfy N≥20 ms/50 µs=400.

In contrast, when the number of storage locations for the cycle Tr is N, it is desirable that the control cycle be longer than N/Tr. It is also desirable to approximate the phase amount φ by which the phase is led, which should originally be the time to when converted into time, by k/(N/Tr) by introducing a non-negative integer k. This is because the phase-leading of the command value Ic* can be performed by delaying values for (N−k) data. The same applies to the delay units 31*d* and 31*q*.

Alternatively, when the above-mentioned integer k for the time to corresponding to the led phase does not exist, integers k1 and k2 may be determined as shown below by expressing the fractional part of ta/Tr as F[ta/Tr], and a substantially phase-led command value may be obtained through interpolation using the (N−k1)th command value and the (N−k2)th command value. The same applies to the delay units 31*d* and 31*q*.

$$k1 = ta/Tr - F[ta/Tr], k2 = k1 + 1$$

While the present disclosure has been described in detail, the foregoing description is in all aspects illustrative and not restrictive. It is therefore understood that numerous modifications that have not been described can be devised without departing from the scope of the present disclosure.

The invention claimed is:

1. An active filter control device that controls a parallel active filter connected to an AC power supply through an interconnection reactor and outputting compensating current, said AC power supply supplying load current to a load, said active filter control device comprising:
    a harmonic component extraction unit obtaining a command value of said compensating current from a harmonic component of said load current;
    a difference current generation unit obtaining a deviation between said compensating current and a value obtained by leading a phase of said command value by a predetermined phase difference;
    a current controller generating a control signal based on output of said difference current generation unit; and
    a driving signal generation circuit generating, based on said control signal, a driving signal driving said parallel active filter, wherein
    said difference current generation unit includes:
        a delay unit performing processing of delaying said command value by a phase obtained by subtracting said predetermined phase difference from a phase for one cycle of said AC power supply; and
        a subtracter obtaining a difference between output of said delay unit and said compensating current, and
    said delay unit includes a memory having N storage locations storing said command value for one cycle Tr of said power supply, and outputs said command value delayed for (N−k) data by introducing a non-negative integer k which approximates the time (ta) corresponding to said phase difference by k/(N/Tr).

2. The active filter control device according to claim 1, wherein
said command value is obtained by removing a DC component from said load current grasped in a rotating coordinate system synchronizing with a phase of said AC power supply, and further performing coordinate conversion so as to be grasped in a fixed coordinate system,
said compensating current is grasped in said fixed coordinate system, and
said deviation is obtained in said fixed coordinate system.

3. The active filter control device according to claim 1, wherein
said command value is obtained by removing a DC component from said load current grasped in a rotating coordinate system synchronizing with a phase of said AC power supply,
said compensating current is grasped in said rotating coordinate system, and
said deviation is obtained in said rotating coordinate system.

4. An active filter control device that controls a parallel active filter connected to an AC power supply through an interconnection reactor and outputting compensating current, said AC power supply supplying load current to a load, said active filter control device comprising:
a harmonic component extraction unit obtaining a command value of said compensating current from a harmonic component of said load current;
a difference current generation unit obtaining a deviation between said compensating current and a value obtained by leading a phase of said command value by a predetermined phase difference;
a current controller generating a control signal based on output of said difference current generation unit; and
a driving signal generation circuit generating, based on said control signal, a driving signal driving said parallel active filter, wherein
said difference current generation unit includes:
a delay unit performing processing of delaying said command value by a phase obtained by subtracting said predetermined phase difference from a phase for one cycle of said AC power supply; and
a subtracter obtaining a difference between output of said delay unit and said compensating current, and
said delay unit includes a memory having N storage locations storing said command value for one cycle Tr of said power supply, and introduces a first integer k1 determined by subtracting a fractional part (F[ta/Tr]) of a value (ta/Tr) obtained by dividing the time (ta) corresponding to the said phase difference by said one cycle (Tr), and a second integer k2 determined by adding 1 to said first integer k1 to output a value obtained through interpolation using said (N−k1)th command value and said (N−k2)th command value.

5. The active filter control device according to claim 4, wherein
said command value is obtained by removing a DC component from said load current grasped in a rotating coordinate system synchronizing with a phase of said AC power supply, and further performing coordinate conversion so as to be grasped in a fixed coordinate system,
said compensating current is grasped in said fixed coordinate system, and
said deviation is obtained in said fixed coordinate system.

6. The active filter control device according to claim 4, wherein
said command value is obtained by removing a DC component from said load current grasped in a rotating coordinate system synchronizing with a phase of said AC power supply,
said compensating current is grasped in said rotating coordinate system, and
said deviation is obtained in said rotating coordinate system.

7. The active filter control device according to claim 4, wherein said load is an air conditioner including:
an inverter; and
a compressor controlled by said inverter to compress a refrigerant.

* * * * *